United States Patent

Sierad

[15] 3,645,777

[45] Feb. 29, 1972

[54] PROCESS OF COATING GLASS WITH DURABLE COATINGS AND RESULTING PRODUCTS

[72] Inventor: Theodore B. Sierad, Harrison, N.Y.

[73] Assignee: The Brudenell Corporation, Port Washington, N.Y.

[22] Filed: Sept. 4, 1970

[21] Appl. No.: 69,962

[52] U.S. Cl. ...............................117/71 R, 117/72, 117/94, 117/124 E, 260/851
[51] Int. Cl. ........................................C03c 17/32, C23c 3/02
[58] Field of Search................117/71 R, 72, 124 E; 260/851

[56] References Cited

UNITED STATES PATENTS

| 2,607,750 | 8/1952 | Wilson et al. | 260/851 X |
| 2,650,184 | 8/1953 | Biefeld | 117/72 X |
| 2,884,342 | 4/1959 | Wolff | 260/851 X |
| 2,917,439 | 12/1959 | Liu | 117/71 R X |
| 2,956,902 | 10/1960 | Greif | 260/851 X |
| 3,024,216 | 3/1962 | Smitmans et al. | 117/124 E X |
| 3,183,282 | 5/1965 | Hurwitz | 260/851 X |
| 3,214,286 | 10/1965 | Ramberger | 117/72 X |
| 3,479,198 | 11/1969 | Barth | 117/72 X |
| 3,515,579 | 6/1970 | Shepherd et al. | 117/124 E |

Primary Examiner—Alfred L. Leavitt
Assistant Examiner—J. R. Batten, Jr.
Attorney—Darby & Darby

[57] ABSTRACT

A glass coating composition comprising 30 to 57 parts by weight of a butylated urea formaldehyde, 10 to 35 parts by weight of a partially hydrolyzed copolymer of vinyl acetate and vinyl chloride, and 27 to 45 parts by weight of a hydrogenated furfuraldehyde ketone useful in the application of decorative coatings to glass articles and the like, including various types of electrical lamps wherein a colorful effect is obtained.

8 Claims, No Drawings

PROCESS OF COATING GLASS WITH DURABLE COATINGS AND RESULTING PRODUCTS

This invention relates to glass coating compositions. More particularly this invention relates to a durable glass coating composition useful in the application of decorative coatings to glass. Still more particularly this invention relates to a durable glass coating composition useful in the application of decorative metallic-appearing coatings to incandescent light bulbs.

It is well known in the prior art to provide decorative coatings on the exterior glass surfaces of various glass fixtures including electric lamps. For example, decorative coatings have been applied to various types of incandescent lamps for use as Christmas tree ornaments and decorative lights. Various lacquers and silvering compositions have been coated onto the exterior surfaces of incandescent lamps to provide these decorative effects. These decorative coatings are subject to handling and intense heat radiated from the incandescent lamp, and it has been found that the prior art coatings have a tendency to chip, crack or peel after relatively short use. Another problem encountered in applying decorative coatings to the exterior surfaces of incandescent lamps, as well as other glass articles, is the difficulty in securing good adherence of the coating to the generally glossy surface to provide a uniform uninterrupted coating without chips, cracks, or pinholes. To this end, the prior art has utilized intermediate compositions as base coatings applied to the glass substrate upon which the decorative coating could be more uniformly applied, thereby attempting to provide improved appearance and durability.

The prior art has utilized nitrocellulose, as well as oleoresinous-type coatings as intermediate compositions for the glass substrate upon which decorative silver and lacquer coatings have been applied. Although providing improved coating qualities, these intermediate compositions do not provide improved coating durability, since they are affected by the constant temperature humidity change incident to operation of the lamp and begin to chip off after a few months, carrying the decorative material with them.

It is an object of this invention to provide a coating composition useful as a base coating in the application of decorative coatings to glass surfaces.

Another object is the provision of a coating composition useful as a base coating in the application of decorative coatings to incandescent lamps.

A further object is the provision of a decorative coating for glass surfaces.

A still further object provides a process for applying the novel coating compositions of this invention.

The foregoing and other objects will be apparent from the following description of the invention.

The novel compositions of this invention which are particularly useful for coating glass comprise 30–57 parts by weight of butylated urea formaldehyde, 10–35 parts by weight of a partially hydrolyzed copolymer of vinyl acetate and vinyl chloride, and 27–45 parts by weight of a hydrogenated furfuraldehyde ketone. This composition is applied as a base coat to a glass substrate, and a decorative coating subsequently applied thereupon. An optional top coating can be applied over the decorative coating. All weights are given by dry weight, it being understood that most of the components of this composition are provided in solution.

The amount of hydrogenated furfuraldehyde ketone used in the composition determines the curing time of the base coating. When a greater amount is used, a longer curing time will be required. However, a tougher coating will result. The curing time as well as the solids content of the base coating may be varied by increasing or decreasing the amount of partially hydrolyzed vinyl copolymer used in the base coating composition. When a higher amount of the partially hydrolyzed vinyl copolymer is employed in the base coating composition, the curing time will be reduced; however, the coating will not be as glossy and will contain less solids.

A wide range of organic solvents may be used alone or in a solvent blend for applying the cross-linkable base layer of this invention. Suitable solvents include ethylene glycol monoethyl ether, methyl isobutyl ketone, methyl ethyl ketone, methyl iso-amyl ketone or hydroxy ethyl acetate. Aromatic solvents and aliphatic naphtha solvents have a deleterious effect upon subsequent silvering processes and they should not be employed if such processes will be employed to provide the decorative coating.

A catalyst solution useful in the preparation of the base coating composition is made by mixing 10–40 parts by volume of concentrated hydrocholric acid with 128 parts by volume of ethylene glycol mono-ethyl ether. An amount of catalyst solution equal to 25–75 percent of the dry solids weight of the base coating composition is added just prior to use. The entire batch of base coating composition should be used within 40 minutes of the addition of the catalyst solution. The resistance of the base coating to chipping and peeling may be increased by increasing the amount of acid from 10 to 40 parts in this catalyst solution. It should be noted, however, that this will result in a hazing or burning of the final decorative coating, and may not be desirable in all applications.

A preferred process for using the coating composition in making a decorative glass article is described below. The base coating composition of this invention is prepared in advance and applied by either spray or dip coating onto a glass surface to be decoratively coated. It is advisable that the base coating composition be used within 40 minutes of its preparation to achieve maximum coating regularity, uniformity and durability. The base coating may be applied in either one layer or a plurality of layers, the thickness of each layer preferably ranging from 0.001–0.002 inches.

After coating with the base layer, the glass article is cured in an oven. The first layer of base coating is dried in an oven for 1 to 2 minutes at 200° F. and then ideally air cooled for 30 seconds at room temperature. If a second layer of base coating is used, it is applied over the dried first layer with approximately the same thickness as the first layer, and the glass article again cured in a clean air-oven at a temperature of 325°–390° F. for 1 to 2 minutes. The article is again air cooled for at least 30 seconds.

An appropriate decorative coating such as metallic film of silver or gold, or aluminum is then applied to the cured base coating. Suitable processes for applying silver coatings to the base coating compositions of this invention are well known in the trade and are described in United States Department of Commerce Technical Bulletin No. BD–11236, "Silver Film" by Samuel Weir.

After the decorative coating has been applied, the glass article is blown dry with a dust and oil-free jet of air, and then spray coated with a top coating composition designed to serve as a protective film. A suitable top coating composition comprises 11 parts by weight of a partially hydrolyzed copolymer of vinyl chloride and vinyl acetate (VAGH-Bakelite Div., Union Carbide), 6–12 parts by weight of a thermosetting acrylic polymer (AT51 Rohm & Haas) in a suitable solvent such as methyl isobutyl ketone. Use of aliphatic naphtha and aromatic solvents should be avoided due to a deleterious effect on decorative silver coatings. A solvent such as dimethylformamide may be optionally employed in applying the top coating as a coating aid and to prevent pin holes. The properties of the top coating may be changed somewhat to suit individual applications by varying the amount of thermosetting acrylic polymer in the coating composition. Higher amounts of polymer tend to improve the adhesive qualities of the top coating, while lower amounts yield a coating having improved resistance to humidity. An appropriate color dye, e.g., 2–RB 80 percent Blue, Orange-G, etc., can also be included in the top coating to provide various color effects. The thickness of the top coating ranges between 0.0005 and 0.001 inch.

After the top coating has been applied, the glass article is air dried for 45 seconds and may then be handled.

The coated article is finally baked in an oven for a period of 15 to 45 minutes at a temperature of 240°–310° F., the exact time and temperature depending upon the materials used and the specific results desired in the final product.

The decorative coating compositions of this invention are durable and resistant to chipping and peeling as well as variations in temperature and humidity. They are particularly useful in the decoration of incandescent lamps and other glass articles which are subjected to handling or temperature extremes, e.g., ashtrays.

The invention will be further illustrated by, but is not intended to be limited to, the following examples:

EXAMPLE 1

A suitable base coating composition was prepared by mixing together 45 grams of a hydrogenated furfuraldehyde ketone in a suitable solvent (Furatone B2 50 percent solids produced by Minnesota Mining & Manufacturing Company), 28 grams of a partially hydrolyzed copolymer of vinyl acetate and vinyl chloride (VAGH Bakelite Div. Union Carbide) dissolved in 126.5 grams of 18 percent methylisobutyl ketone; (the copolymer is 89.5–91.5 percent vinyl chloride, and 1.5–5.2 percent vinyl acetate by weight), and 56.5 grams of butylated urea formaldehyde in a suitable solvent (Rohm & Haas UF 240 60 percent solids) is blended in 37 grams of methyl isobutyl ketone and 42.5 grams of 2 ethoxy ethanol. A catalyst solution was prepared by mixing 40 ml. of concentrated hydrochloric acid and 128 ml. of 2 ethoxy ethanol in a separate container. Thirty-six grams of the catalyst solution was added to the base coating composition immediately before the composition was spray coated to a depth of 0.001 inch onto the envelopes of a number of 50-watt incandescent lamps. The entire coating composition was used within 5 minutes of the addition of the catalyst solution to the coating composition. The incandescent lamps were then cured in a hot-air oven for 2 minutes at 300° F., air cooled at room temperature for 30 seconds and recoated with the same base coating mixture and then cured in a clean hot-air oven at 325° for 1½ minutes.

A decorative silver metal coating was applied by first spraying the coated lamps with 25 percent solution of sodium di-(2 ethyl hexyl) phosphate (Triton N.E. manufactured by Rohm & Haas), and then a solution of stannous chloride. The lamps were then treated with a warm deionized water rinse and coated with a two-part solution mixed immediately prior to application consisting of 10 parts by weight of ammoniated silver nitrate and 1 part by weight of hydrazine reducer. The lamp was finally rinsed with warm deionized water.

A top coating composition was prepared by mixing 11 grams of the vinyl copolymer resin dissolved in 56.5 grams of 18 percent methyl isobutyl ketone with 8.5 grams of a thermosetting acrylic polymer (Rohm & Haas AT51) and 40.2 grams of methyl isobutyl ketone, 16 grams of dimethylformamide and 0.1 grams of 2-RB 80 percent blue dye manufactured by Rohm & Haas. After the top coating of the lamp was blown dry, with a clean air jet, they were spray-coated to a depth of approximately 0.0005 inch with the thus prepared top coating composition. After air drying for 45 seconds the lamps were baked in a hot-air oven at 250° F. for 20 minutes.

EXAMPLE 2

A number of 50-watt incandescent lamps similar to those used in Example 1, were coated in a similar fashion using a base coating composition containing 45 grams hydrogenated furfuraldehyde ketone, 16 grams of a partially hydrolyzed copolymer of vinyl chloride and vinyl acetate as used in Example 1; this composition was blended in 72 grams of methyl-isobutyl ketone and 30 grams of butylated urea formaldehyde and 45.5 grams of a catalyst solution prepared as in Example 1. A decorative silver color coating and a protective top coating were applied as in Example 1.

In both examples described, the finished article was a decorative incandescent lamp having a highly durable decorative coating. However, as should be appreciated, the novel compositions and method of the subject invention can be used with other glass articles. In the case of an electric incandescent lamp, when the filament is energized, there is an apparent change in color of the coating, thereby providing an additional, pleasing, aesthetic effect.

What is claimed is:

1. A coated element comprising a glass base, a cross-linkable base layer coated on one surface of said base comprising 30 parts by weight of butylated urea formaldehyde, 45 parts by weight of hydrogenated furfuraldehyde ketone, and 16 parts by weight of a partially hydrolyzed copolymer of vinyl chloride and vinyl acetate.

2. A coated element as recited in claim 1, further including a decorative coating comprising a thin layer of metallic silver coated on said base coating.

3. A coated element as recited in claim 2, further including a protective top coating comprising 8.5 parts by weight of a thermosetting acrylic polymer, 11 parts by weight of a partially hydrolyzed copolymer of vinyl chloride and vinyl acetate, and 0.1 part by weight of a dye composition.

4. A process for applying a decorative coating composition on a glass surface comprising the steps of coating said glass surface with a cross-linkable base coating composition comprised of 45 parts by weight of a hydrogenated furfuraldehyde ketone, 28 parts by weight of a partially hydrolyzed copolymer of vinyl acetate and vinyl chloride and 56.5 parts by weight of a butylated urea formaldehyde, curing said coated glass surface for 1 to 2 minutes at 200° F., cooling said coated glass surface for 30 seconds at room temperature, applying a thin decorative coat of metallic silver on said base coating, coating said thin metallic layer with a protective top coating, and baking said coating article for 15–45 minutes at a temperature of 240°–310° F.

5. A process for applying a decorative coating to a glass article as recited in claim 4, including the further step of admixing said ketone, said copolymer and said formaldehyde resins and adding an amount equal to 25–75 percent of the weight of said resins of a catalyst composition which comprises 10–40 parts by volume of hydrochloric acid and 128 parts by volume of ethylene glycol mono-ethyl ether, and applying said base coating composition within 40 minutes of adding said catalyst.

6. A process as recited in claim 5, including the further steps of providing a protective top coating composition comprising 11 parts by weight of a partially hydrolyzed copolymer of vinyl acetate and vinyl chloride and 8.5 parts by weight of a thermosetting acrylic resin, and coating said protective top coat to a height of 0.0005–0.001 inch on said decorative metallic coating material.

7. A process as recited in claim 6, including the step of limiting the depth of said base coating to 0.001–0.002 inch.

8. A process as recited in claim 7, including the further step of applying a second layer of said base coating composition and curing said coated glass article in a clean-air oven at a temperature of 325°–390° F. for 1 to 2 minutes, and spraying said base coating with a two-part solution consisting essentially of ammoniated silver nitrate, and hydrazine to deposit a silver coating.

* * * * *